United States Defensive Publication [19] (H) [11] T956,002

Sias [43] Mar. 1, 1977

[54] WATERFLOODING METHOD USING SULFONATES

[75] Inventor: Roy C. Sias, Ponca City, Okla.

[73] Assignee: Continental Oil Company, Ponca City, Okla.

[21] Appl. No.: 659,617

[22] Filed: Feb. 20, 1976

[51] Int. Cl.[2] ..... E21B 43/22

[52] U.S. Cl. ..... 252/8.55 D; 166/274; 166/275

[57] ABSTRACT

A method for recovering hydrocarbons from a petroliferous formation is disclosed. The method comprises injecting into a petroliferous formation an effective amount of an aqueous mixture which contains about 0.5 to about 25 weight percent of an alkali metal hydrocarbon sulfonate mixture and recovering the displaced hydrocarbons from the formation. An important feature of the method is that the alkali metal hydrocarbon sulfonate mixture is prepared by the process of:

a. sulfonating an admixture of (i) an aromatic-containing refinery stream and (ii) a synthetic hydrocarbon sulfonatable feedstock, b. recovering from the reaction mass of step (a) the admixture of hydrocarbon sulfonic acids, and c. converting the hydrocarbon sulfonic acids to the alkali metal salts.

A suitable refinery stream is pale oil extract. Suitable synthetic sulfonatable feedstocks include alkaryl hydrocabons. Inclusion of the synthetic hydrocarbon with the refinery stream results in a product having a lower viscosity than the sulfonate from the refinery stream per se. This lower viscosity results in an improvement when using the sulfonate to recover hydrocarbon from a petroliferous formation.

7 Claims, No Sheets Drawing,

12 Pages Specification

The file of this unexamined application may be inspected and copies thereof may be purchased (849 O.G. 1221, Apr. 9, 1968).